(12) United States Patent
Cui

(10) Patent No.: US 11,650,568 B2
(45) Date of Patent: May 16, 2023

(54) CONTROL SYSTEM OF MACHINE TOOL

(71) Applicant: FANUC CORPORATION, Yamanashi (JP)

(72) Inventor: Hang Cui, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 276 days.

(21) Appl. No.: 16/575,719

(22) Filed: Sep. 19, 2019

(65) Prior Publication Data

US 2020/0103849 A1 Apr. 2, 2020

(30) Foreign Application Priority Data

Sep. 28, 2018 (JP) .............................. JP2018-183229

(51) Int. Cl.
*G05B 19/4093* (2006.01)
*G05B 19/4063* (2006.01)

(52) U.S. Cl.
CPC ... *G05B 19/40938* (2013.01); *G05B 19/4063* (2013.01); *G05B 2219/35398* (2013.01); *G05B 2219/35513* (2013.01)

(58) Field of Classification Search
None
See application file for complete search history.

(56) References Cited

U.S. PATENT DOCUMENTS

2009/0228135 A1* 9/2009 Nakamura ........... G05B 19/409
700/173

FOREIGN PATENT DOCUMENTS

JP H09-212226 A 8/1997
JP 2003202910 A 7/2003

OTHER PUBLICATIONS

An Office Action; "Notice of Reasons for Refusal," mailed by the Japanese Patent Office dated Sep. 29, 2020, which corresponds to Japanese Patent Application No. 2018-183229 and is related to U.S. Appl. No. 16/575,719 ; with English language translation.

* cited by examiner

*Primary Examiner* — Sean Shechtman
(74) *Attorney, Agent, or Firm* — Studebaker & Brackett PC

(57) ABSTRACT

To provide a control system of a machine tool that enables a changed parameter to be reflected to a machine side in an arbitrary timing according to a worker's intention. A control system of a machine tool automated by reflecting a parameter by computerized numerical control, includes a storage unit that, when the parameter is changed, stores the parameter thus changed as a changed parameter, a changed parameter reflection condition setting unit that sets a condition for reflecting the changed parameter, and a changed parameter reflection unit that, when the condition is detected, reflects the changed parameter not yet reflected.

8 Claims, 7 Drawing Sheets

CONTROL SYSTEM OF MACHINE TOOL

This application is based on and claims the benefit of priority from Japanese Patent Application No. 2018-183229, filed on 28 Sep. 2018, the content of which is incorporated herein by reference.

BACKGROUND OF THE INVENTION

Field of the Invention

The present invention relates to a control system of a machine tool.

Related Art

As is well known, in the field of machine tools, the repetition of the same machining procedure, the machining of a complicated shape, and others are highly automated by application of computerized numerical control (CNC) technology and performing numerical control of the movement amount and speed of a tool, and the like with a computer. In addition, designing to manufacturing of an NC machine tool such as an NC lathe or a machining center are consistently automated by importing data created with CAD or CAM into CNC and inputting and controlling various data such as options, parameters, NC programs, macro programs, macro variables, work origin offsets, tool offsets, tool shape data, and tool management data (e.g., see Patent Document 1).

Patent Document 1: Japanese Unexamined Patent Application, Publication No. 2003-202910

SUMMARY OF THE INVENTION

On the other hand, for example, depending on various attributes of parameters, such as functional attributes such as angular axis control and axis synchronous control, and systematic attributes of a machine tool, stopping the power supply of the machine tool may be required each time the worker (user, operator) changes a parameter of CNC. If the change of a plurality of parameters of such an attribute is attempted during the operation of the machine tool, stopping the power supply of the machine tool is required for each parameter change; therefore, there is a disadvantage that the operation of changing the parameters greatly affects the machining operation and thus the productivity.

In addition, for example, as shown in FIG. 7, when a plurality of parameters are simultaneously changed, if a power supply stop differing from a normal power supply stop, such as an unexpected power supply stop such as a power outage or an urgent power supply stop, occurs at the stage where part of the parameters is changed, an unfixed setting state where part of the parameters is changed is reflected in the machine tool when the power supply is recovered and the power is supplied again, and the machine tool may be operated in the unfixed setting state.

Therefore, it has been strongly desired that the changed parameters can be reflected to the machine side in an arbitrary timing according to the worker's intention, and that it is possible to prevent the changed parameters from affecting the machine side regardless of the worker's intention.

In view of the above circumstances, it is an object of the present invention to provide a control system of a machine tool that enables changed parameters to be reflected to the machine side in an arbitrary timing according to the worker's intention.

The inventors have found a method of reflecting changed parameters to the machine side in an arbitrary timing according to the worker's intention, and have completed the present invention.

A first aspect of the present invention is a control system of a machine tool automated by reflecting a parameter by computerized numerical control, and is characterized by including a storage unit that, when the parameter is changed, stores the parameter thus changed as a changed parameter, a changed parameter reflection condition setting unit that sets a condition for reflecting the changed parameter, and a changed parameter reflection unit that, when the condition is detected, reflects the changed parameter not yet reflected.

In a second aspect of the present invention according to the first aspect, one or more of the conditions for reflecting the changed parameter may be set and may be at least an operation of supplying power from a power supply to the machine tool according to a worker's intention.

In a third aspect of the present invention according to the first or second aspect, the storage unit may store an unreflected parameter list, and the control system may include an unreflected parameter list update unit that, when the parameter is changed, updates the unreflected parameter list, and an unreflected parameter display unit that displays the unreflected parameter list.

According to the present invention, it is possible to reflect a changed parameter to the machine side in an arbitrary timing according to the worker's intention, and it is possible to prevent the changed parameter from affecting the machine side regardless of the worker's intention.

This makes it unnecessary to stop power being supplied to the machine tool to reflect a parameter each time the worker changes the parameter, and resolves a disadvantage that the operation of changing the parameter greatly affects the machining operation and thus the productivity.

DETAILED DESCRIPTION OF THE INVENTION

Referring to FIGS. 1 to 6, a control system of a machine tool according to an embodiment of the present invention will be described.

A control system A of the machine tool of the present embodiment is configured to automate machining work by reflecting various data such as options, parameters, NC programs, macro programs, macro variables, work origin offsets, tool offsets, tool shape data, and tool management data to the machine tool side (CNC: computerized numerical control) such as an NC lathe or a machining center. The control system A of the machine tool is configured by using a computer including a memory such as a read only memory (ROM) or a random access memory (RAM), a control processing unit (CPU), and a communication control unit, which are mutually connected through buses. Examples of the parameters include various parameters related to the control and the like of the machine tool, such as the angle of a tilting axis and the axis number of the tilting axis related to angular axis control.

Figure 1:
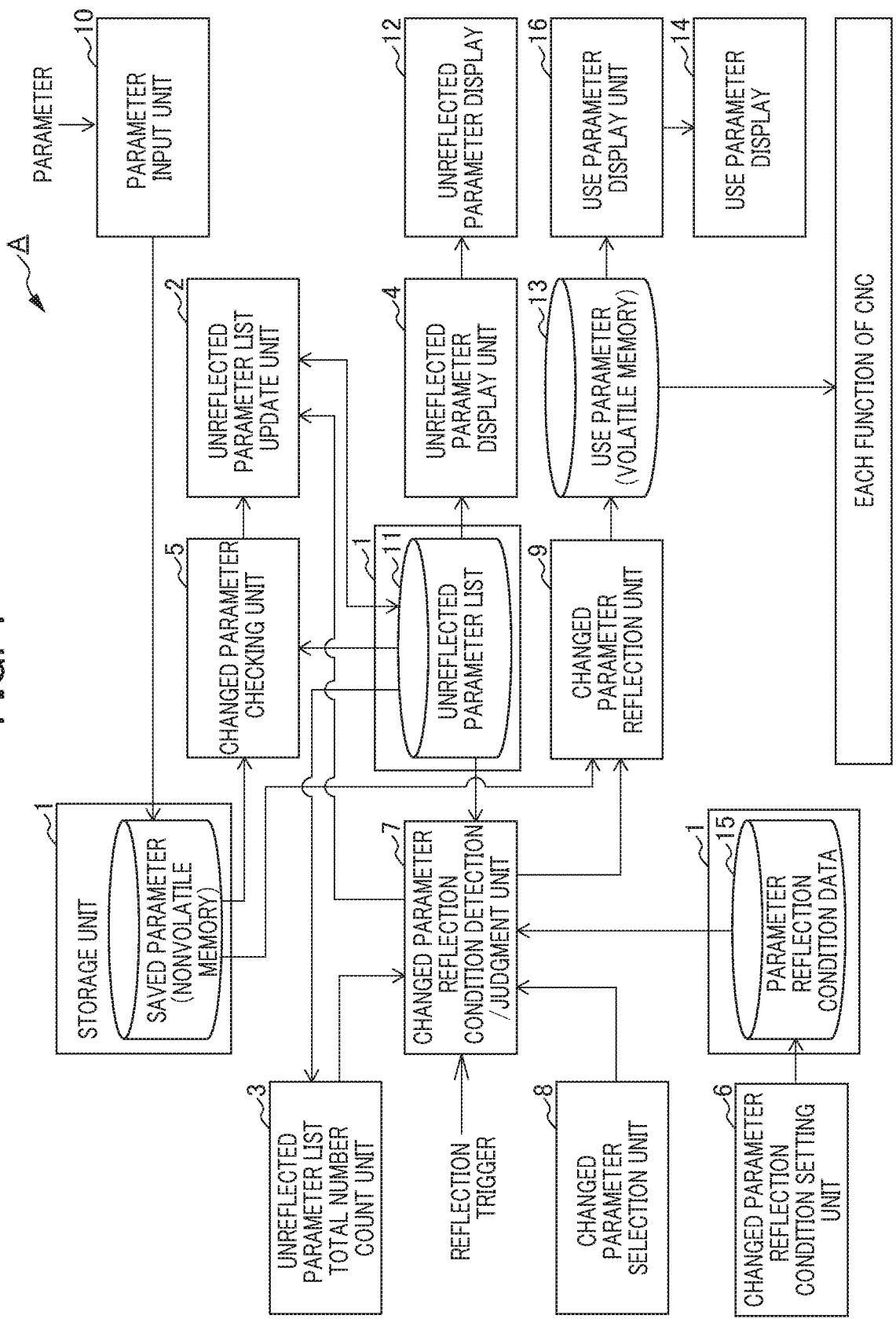
FIG. 1 is a block diagram illustrating a control system of a machine tool according to an embodiment of the present invention.

Further, as shown in FIG. 1, the control system A of the machine tool of the present embodiment includes a storage unit 1, an unreflected parameter list update unit 2, an unreflected parameter list total number count unit 3, an unreflected parameter display unit 4, a changed parameter checking unit 5, a changed parameter reflection condition setting unit 6, a changed parameter reflection condition detection/judgment unit 7, a changed parameter selection unit 8, a changed parameter reflection unit 9, a parameter input unit 10 that inputs parameters, and a use parameter display unit 16.

When a parameter is changed, the storage unit 1 stores a temporarily changed parameter. The storage unit 1 stores a list 11 of parameters (unreflected parameters) that are not reflected on the machine side. Further, the storage unit 1 stores data 15 of conditions for reflecting the parameters.

When parameters are changed, the unreflected parameter list update unit 2 generates and updates the list 11 of changed parameters (unreflected parameters) that are not reflected on the machine side.

The reflected parameter list total number count unit 3 counts the number of unreflected parameters in the unreflected parameter list 11. Each time the unreflected parameter list 11 is updated, the number of unreflected parameters is counted.

The unreflected parameter display unit 4 has the unreflected parameters in the unreflected parameter list 11, which is updated (generated) by the unreflected parameter list update unit 2, displayed on an unreflected parameter display 12.

When a parameter is changed, the changed parameter checking unit 5 checks whether a changed parameter exists in the unreflected parameter list 11.

The changed parameter reflection condition setting unit 6 sets a condition (reflection trigger) for reflecting a changed parameter to the machine side. Examples of the conditions for reflecting the changed parameter to the machine side include normal re-turning on of the power supply of the machine tool (power supply operation, start-up) according to the worker's intention, executing the reset operation for resetting the parameter by the worker, and executing the pressing-down operation of a specific button for each changed parameter by the worker. In addition, the changed parameter reflection condition setting unit 6 can also set the condition for reflecting the changed parameter to the machine side as unconditional.

The changed parameter reflection condition detection/judgment unit 7 detects conditions for reflecting the changed parameters to the machine side, i.e., reflection triggers such as normal re-turning on of the power supply of the machine tool (power supply operation, start-up) according to the worker's intention, the reset operation, and the pressing-down operation of a specific button.

The changed parameter reflection condition detection/judgment unit 7 judges whether the detected condition is a condition (reflection trigger) for reflecting the changed parameter to the machine side. For example, if re-turning on the power supply of the machine tool is the condition for reflecting the changed parameter to the machine side, an unexpected or emergency power supply stop detection/storage unit or the like that can distinguish re-turning on of the power supply of the machine tool after an unexpected power supply stop such as a power outage or an emergency power supply stop occurs from normal re-turning on of the power supply according to the worker's intention, is included. Based on detection and storage results of the power supply stop detection/storage unit or the like, it is judged whether a condition detected by the changed parameter reflection condition detection/judgment unit 7 is the condition for reflecting the changed parameter to the machine side.

The changed parameter selection unit 8 is a unit for selectively reflecting at least part of a plurality of changed parameters to the machine side. For example, when a specific button corresponding to each changed parameter is pressed down according to the worker's intention, the changed parameter selection unit 8 is configured to reflect only the changed parameter corresponding to the specific button pressed down to the machine side.

When a condition detected by the changed parameter reflection condition detection/judgment unit 7 is judged as the condition for reflecting the changed parameter to the machine side, the changed parameter reflection unit 9 reflects an unreflected changed parameter as a use parameter 13 for controlling each function of CNC. In the present embodiment, the use parameter 13 reflected by the changed parameter reflection unit 9 is displayed on a display 14.

The parameter input unit 10 is a unit for inputting a parameter to store it in the storage unit 1 by the worker. The use parameter display unit 16 has the use parameter 13 displayed on the use parameter display 14.

Figure 2:
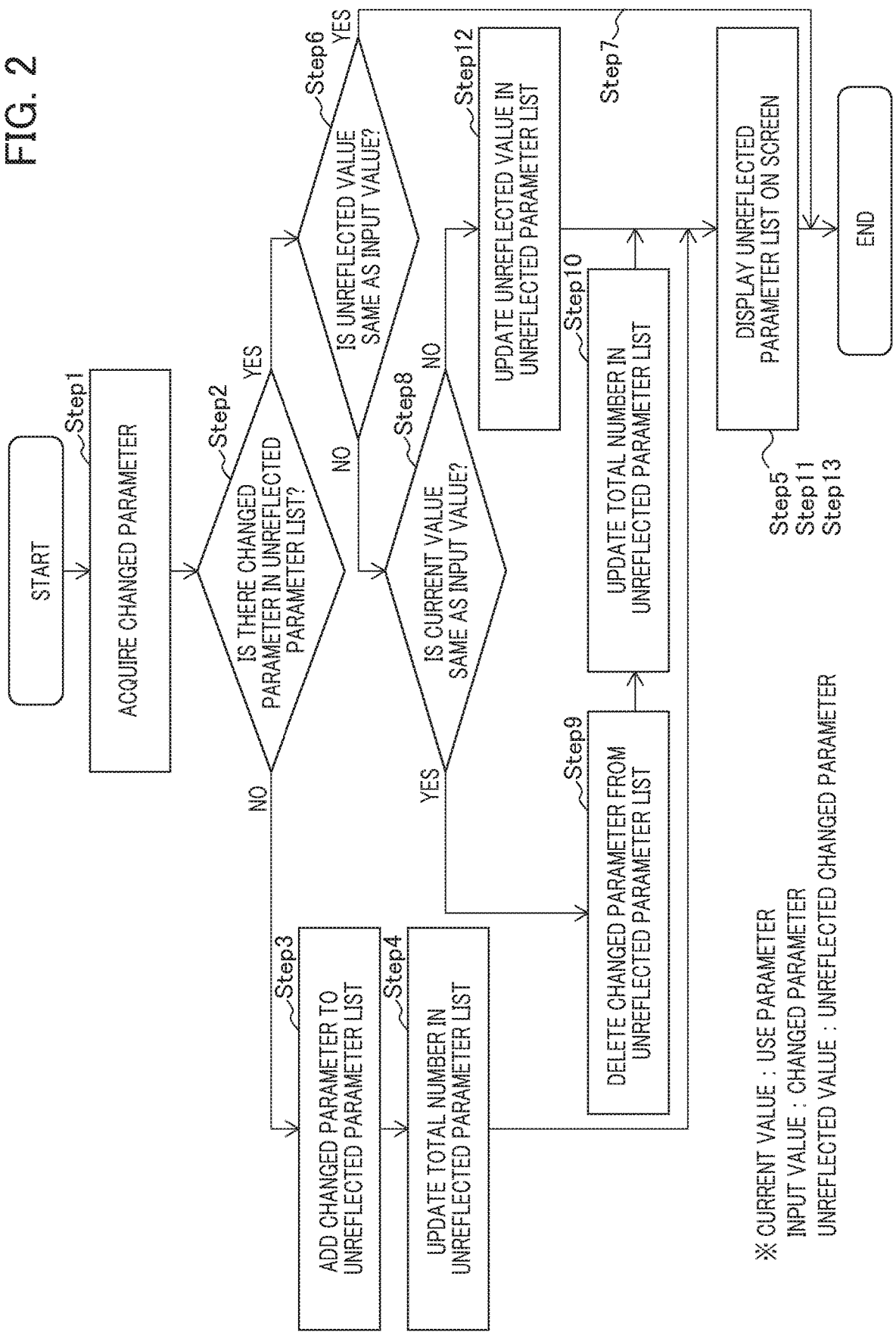
FIG. 2 is a flowchart for judging the necessity of adding a changed parameter and updating an unreflected parameter list, using a control system of a machine tool according to an embodiment of the present invention.

When a parameter is changed in the control system A of the machine tool of the present embodiment, as shown in FIG. 2 (and FIG. 1), if the worker first changes the parameter using the parameter input unit 10, a changed parameter is temporarily stored in the storage unit 1. Along with this, the changed parameter checking unit 5 acquires the changed parameter from the storage unit 1 (Step 1), and checks whether the changed parameter exists in the unreflected parameter list 11 (Step 2).

If the changed parameter does not exist in the unreflected parameter list 11, the unreflected parameter list update unit 2 adds the changed parameter to the unreflected parameter list 11 (Step 3). The unreflected parameter list total number count unit 3 updates the total number in the unreflected parameter list (Step 4). Further, the unreflected parameter display unit 4 has the updated unreflected parameter list 11 displayed on the screen of the display 12 (Step 5).

On the other hand, when the changed parameter exists in the unreflected parameter list 11, the changed parameter checking unit 5 checks whether the parameter (unreflected value) in the unreflected parameter list 11 is the same as the changed parameter (input value) (Step 6).

When the parameter (unreflected value) in the unreflected parameter list 11 is the same as the changed parameter (input value), no particular change is required; thus, the process is completed (Step 7).

When the parameter (unreflected value) in the unreflected parameter list 11 differs from the changed parameter (input value), it is checked whether the use parameter (current value) used in the control of the machine tool is the same as the changed parameter (input value) at this time (Step 8).

When the use parameter (current value) is the same as the changed parameter (input value), the unreflected parameter list update unit 2 deletes the changed parameter (input value) from the unreflected parameter list 11 (Step 9), the unreflected parameter list total number count unit 3 updates the total number in the unreflected parameter list 11 (Step 10), and the unreflected parameter display unit 4 has the updated unreflected parameter list 11 displayed on the screen of the unreflected parameter display 12 (Step 11).

When the use parameter (current value) differs from the changed parameter (input value), the unreflected parameter list update unit 2 updates the unreflected parameter list to add the changed parameter (input value) (Step 12), and the unreflected parameter display unit 4 has the updated unreflected parameter list 11 displayed on the screen of the unreflected parameter display 12 (Step 13).

On the other hand, in the control system A of the machine tool of the present embodiment, as shown in FIG. 1, the changed parameter reflection condition setting unit 6 sets data 15 of conditions (reflection trigger) for reflecting parameters in advance, and the storage unit 1 stores the data.

Figure 3:
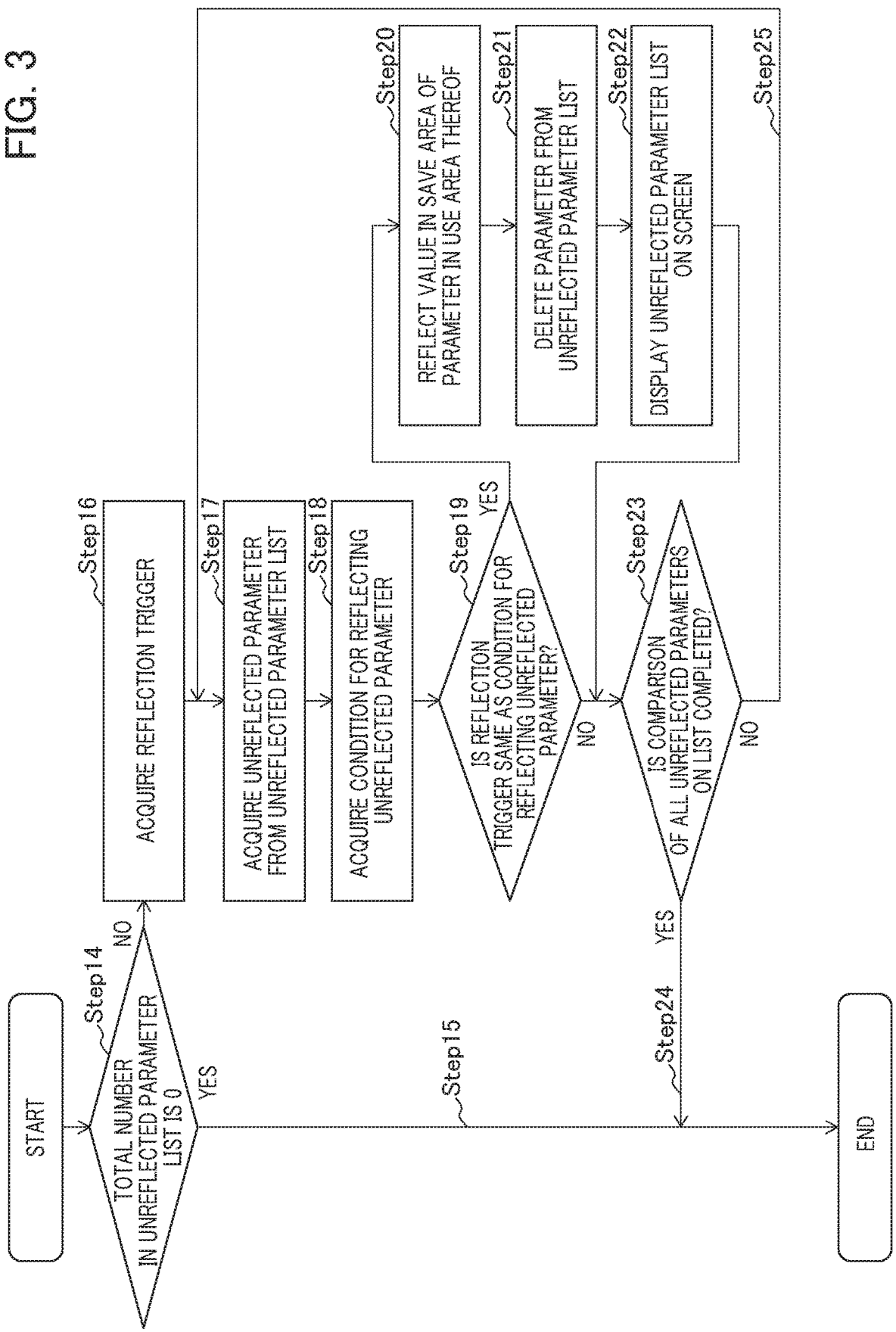
FIG. 3 is a flowchart for detecting a reflection trigger and reflecting a changed parameter in a use parameter, using a control system of a machine tool according to an embodiment of the present invention.

In the control system A of the machine tool of the present embodiment, as shown in FIG. 3 (and FIG. 1), when the changed parameter reflection condition detection/judgment unit 7 detects a reflection trigger, the changed parameter reflection condition detection/judgment unit 7 checks whether the total number of unreflected parameters counted by the unreflected parameter list total number count unit 3 is "0" (Step 14).

When the total number in the unreflected parameter list is "0", there is no changed parameter to be reflected to the machine tool side; thus, the process is completed (Step 15).

When the total number in the unreflected parameter list is not "0", that is, when there is a changed parameter that is not yet reflected in the unreflected parameter list 11, the unreflected parameter list update unit 2 and the changed parameter reflection condition detection/judgment unit 7 acquires the reflection trigger detected by the changed parameter reflection condition detection/judgment unit 7 (Step 16). Along with this, the unreflected parameter list update unit 2 and the changed parameter reflection condition detection/judgment unit 7 acquire the unreflected parameter from the unreflected parameter list 11 (Step 17).

Further, the changed parameter reflection condition detection/judgment unit 7 acquires the condition for reflecting the unreflected parameter previously set by the changed parameter reflection condition setting unit 6 from the parameter reflection condition data 15 (Step 18).

The changed parameter reflection condition detection/judgment unit 7 checks whether the detected reflection trigger and the condition for reflecting the unreflected parameter (reflection trigger that is set) are the same (Step 19).

When the detected reflection trigger and the condition for reflecting the unreflected parameter are the same, the changed parameter reflection unit 9 sets the changed parameter as the use parameter 13, and the use parameter display unit 16 has the parameter displayed on the use parameter display 14 (Step 20). In addition, the changed parameter reflected as the use parameter 13 from the unreflected parameter list 11 is deleted (Step 21), and the updated unreflected parameter list is displayed on the display 12 (Step 22).

Further, it is confirmed whether comparison and checking of all unreflected parameters in the unreflected parameter list 11 are completed (Step 23), and if it is completed, the reflecting operation of the changed parameters is completed (Step 24). If it is not completed, the unreflected parameters are acquired from the unreflected parameter list until the comparison and checking of all unreflected parameters in the unreflected parameter list 11 are completed (Step 25 and Step 17), and the same operation as described above is repeated.

Figure 4:
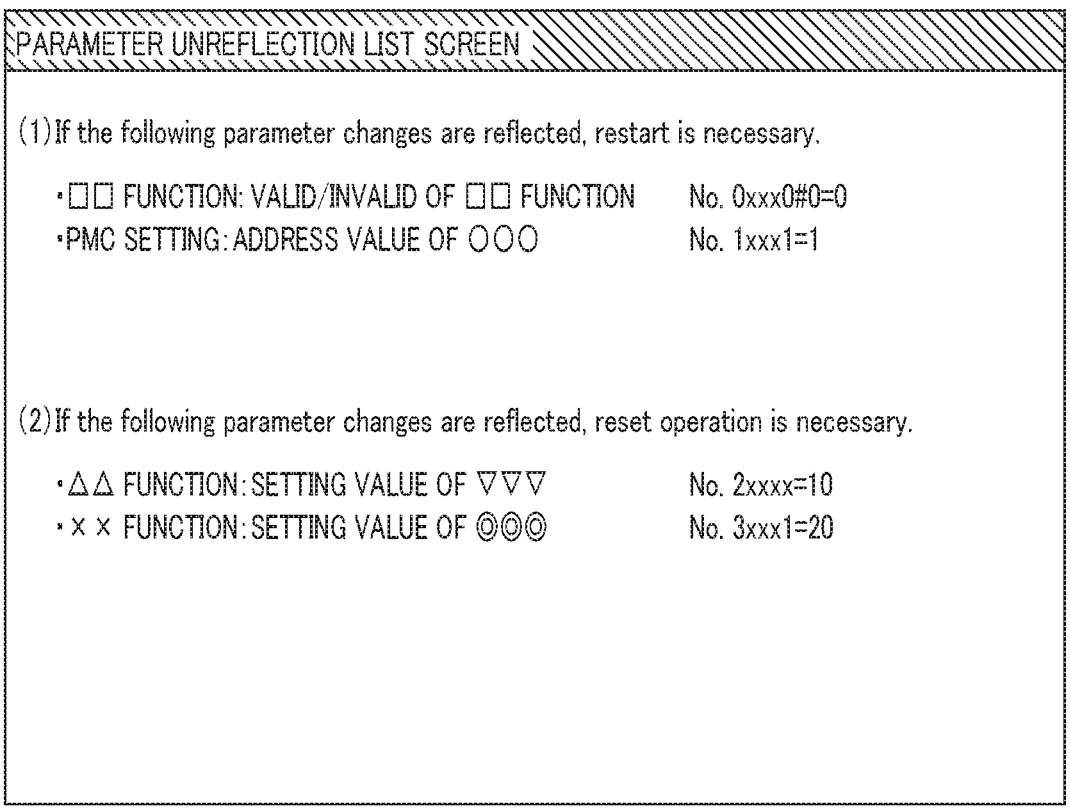
FIG. 4 is a diagram showing an example of an image displayed by a changed parameter display unit of a control system of a machine tool according to an embodiment of the present invention.

FIG. 4 shows an example of a screen to be displayed on the display 12 by the unreflected parameter display unit 4, and the worker can easily recognize whether there are unreflected parameters by seeing such a screen.

Figure 5:
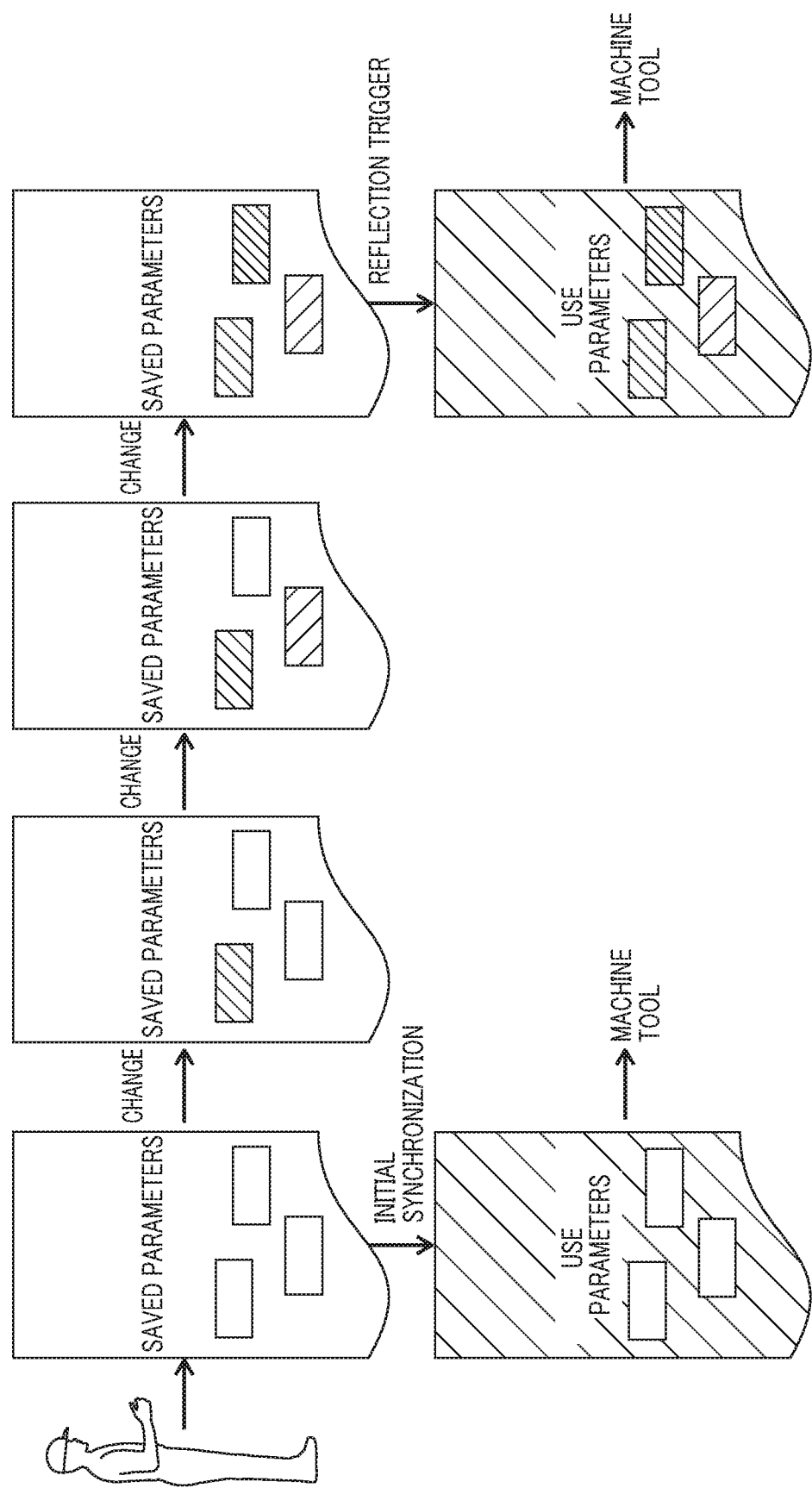
FIG. 5 is a diagram showing timing on when changed parameters are reflected in use parameters in the case of using a control system of a machine tool according to an embodiment of the present invention.

Therefore, in the control system A of the machine tool of the present embodiment, as shown in FIG. 5, with respect to a specific parameter, it is possible to easily identify an unreflected condition of the parameter in which a saved changed parameter and a use parameter are not equal.

Figure 6:
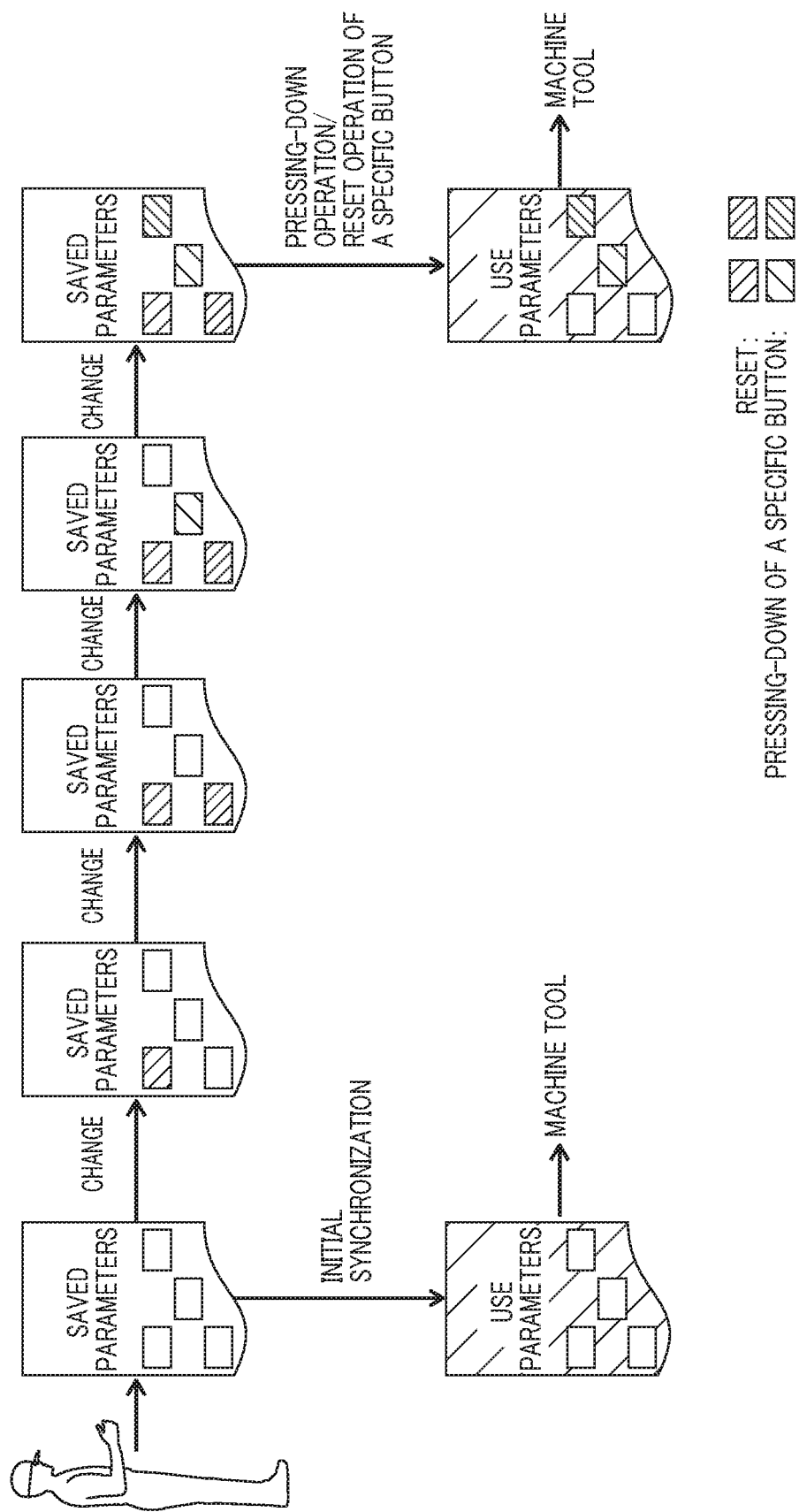
FIG. 6 is a diagram showing timing on when changed parameters are reflected in use parameters in the case of using a control system of a machine tool according to an embodiment of the present invention.
Figure 7:
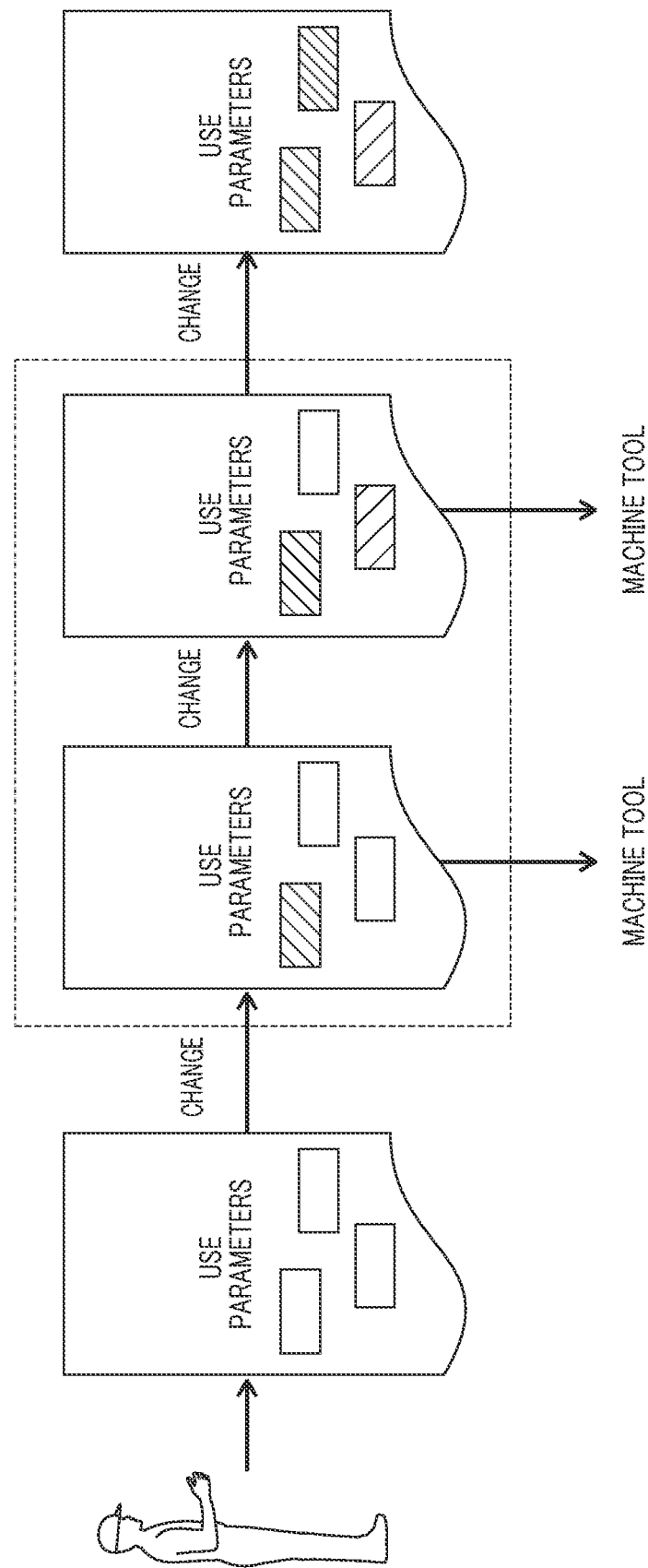
FIG. 7 is a diagram showing timing on when changed parameters are reflected in use parameters in the case of using a conventional control system of a machine tool.

In addition, the worker can reflect the changed parameters on the machine side according to a reflection trigger previously arbitrarily set by the worker, such as stopping or turning on the power supply, or as shown in FIG. 6, pressing down or reset a specific button, that is, in an arbitrary timing according to the worker's intention; thus, it is possible to prevent the changed parameter from affecting the machine side regardless of the worker's intention.

Therefore, according to the control system A of the machine tool of the present embodiment, each time the worker changes a parameter, it is possible to make it unnecessary to stop the power supply of the machine tool to reflect the parameter, and it is possible to resolve a disadvantage that the changing operation of the parameter greatly affects the machining operation and thus the productivity.

Further, in the control system A of the machine tool of the present embodiment, a plurality of changed parameters can be saved in the storage unit 1 (unreflected parameter list 11) in advance, and the use parameters can be updated at once by the reflection trigger.

In addition, it is possible to set that the use parameters are updated by a plurality of reflection triggers.

One embodiment of the control system of the machine tool according to the present invention has been described; however, the present invention is not limited to the above-mentioned embodiment, and modification can be made as appropriate without departing from the spirit of the invention.

1 STORAGE UNIT
2 UNREFLECTED PARAMETER LIST UPDATE UNIT
3 UNREFLECTED PARAMETER LIST TOTAL NUMBER COUNT UNIT
4 UNREFLECTED PARAMETER DISPLAY UNIT
5 CHANGED PARAMETER CHECKING UNIT
6 CHANGED PARAMETER REFLECTION CONDITION SETTING UNIT
7 CHANGED PARAMETER REFLECTION CONDITION DETECTION/JUDGMENT UNIT
8 CHANGED PARAMETER SELECTION UNIT
9 CHANGED PARAMETER REFLECTION UNIT
10 PARAMETER INPUT UNIT

11 UNREFLECTED PARAMETER LIST
12 UNREFLECTED PARAMETER DISPLAY
13 USE PARAMETER
14 USE PARAMETER DISPLAY
15 PARAMETER REFLECTION CONDITION DATA
16 USE PARAMETER DISPLAY UNIT
A CONTROL SYSTEM OF MACHINE TOOL

What is claimed is:

1. A control system of a machine tool automated by computerized numerical control, the control system comprising a processor, the processor being configured to:
store a parameter as a changed parameter in a non-transitory, computer readable storage when the parameter is changed;
store a trigger for reflecting the changed parameter in the non-transitory, computer readable storage in advance, the trigger being associated with a specific operation corresponding to the changed parameter and excluding an operation state in which reflecting the changed parameter causes an unstable state of the machine tool;
detect a condition of the machine tool;
determine whether the detected condition satisfies the trigger;
reflect the stored changed parameter to the machine tool when it is determined that the detected condition satisfies the trigger so as to
automatically control the machine tool based on the reflected parameter, whereas
prevent reflecting the stored changed parameter to the machine tool when it is determined that the detected condition does not satisfy the trigger.

2. The control system of a machine tool according to claim 1, wherein one or more conditions for reflecting the changed parameter are set and are at least an operation of supplying power from a power supply to the machine tool according to an operator's intention.

3. The control system of a machine tool according to claim 1, wherein the storage stores an unreflected parameter list, the processor is further configured to:
update the unreflected parameter list when the parameter is changed; and
display the unreflected parameter list on an unreflected parameter display unit.

4. The control system of a machine tool according to claim 2, wherein the storage stores an unreflected parameter list, the processor is further configured to:
update the unreflected parameter list when the parameter is changed; and
display the unreflected parameter list on an unreflected parameter display unit.

5. The control system of a machine tool according to claim 1, wherein the processor is further configured to:
temporarily stores the changed parameter in the storage;
update a total number of unreflected changed parameter temporarily stored in the storage;
check whether the updated total number of the unreflected changed parameters is zero when it is determined that the detected condition satisfies the trigger; and
stores the changed parameter as a use parameter in a volatile memory to reflect the changed parameter to the machine tool when the total number is not zero.

6. The control system of a machine tool according to claim 1, wherein the specific operation includes re-turning on operation of the machine tool by an operator, a reset operation by the operator, or a pressing-down operation of a specific button by the operator.

7. The control system of a machine tool according to claim 3, wherein the processor is further configured to delete the changed parameter reflected as a use parameter from the unreflected parameter list.

8. The control system of a machine tool according to claim 4, wherein the processor is further configured to delete the changed parameter reflected as a use parameter from the unreflected parameter list.

* * * * *